United States Patent [19]
Mori et al.

[11] Patent Number: 5,095,089
[45] Date of Patent: Mar. 10, 1992

[54] POLYESTER COPOLYMER

[75] Inventors: Hiroshi Mori; Naoki Yamamoto, both of Otake; Hitoshi Iwasaki; Noriyuki Taziri, both of Toyohashi, all of Japan

[73] Assignee: Mitsubishi Rayon Company, Ltd., Tokyo, Japan

[21] Appl. No.: 571,537

[22] PCT Filed: Dec. 28, 1989

[86] PCT No.: PCT/JP89/01326
  § 371 Date: Aug. 28, 1990
  § 102(e) Date: Aug. 28, 1990

[87] PCT Pub. No.: WO90/07535
  PCT Pub. Date: Jul. 12, 1990

[30] Foreign Application Priority Data
  Dec. 28, 1988 [JP] Japan .................. 63-334861
  Dec. 28, 1988 [JP] Japan .................. 63-334862

[51] Int. Cl.$^5$ .............................. C08G 63/02
[52] U.S. Cl. .................. 528/272; 528/307; 528/708.1; 528/308.6
[58] Field of Search ............ 528/272, 307, 308.1, 528/308.6

[56] References Cited

U.S. PATENT DOCUMENTS

| | | | |
|---|---|---|---|
| 2,901,466 | 8/1959 | Kibler et al. | 528/288 |
| 4,246,381 | 1/1981 | Robeson | 525/444 |
| 4,259,478 | 3/1981 | Jackson, Jr. et al. | 528/307 |
| 4,557,982 | 12/1985 | Nouda et al. | 428/694 |
| 4,668,764 | 5/1987 | Satou | 528/308.1 |
| 4,786,692 | 11/1988 | Allen et al. | 525/439 |
| 4,900,610 | 2/1990 | Hochberg et al. | 428/195 |

FOREIGN PATENT DOCUMENTS 36-10645 7/1961 Japan .
56-2345 1/1981 Japan .

Primary Examiner—John Kight, III.
Assistant Examiner—Sam A. Acquah
Attorney, Agent, or Firm—Oblon, Spivak, McClelland, Maier & Neustadt

[57] ABSTRACT

Disclosed is a polyester copolymer obtained by reacting (A) a dicarboxylic acid component composed mainly of terephthalic acid or its derivative with (B) a glycol component comprising 15 to 85 mole % of (B-1) an aliphatic diol having 2 to 16 carbon atoms and 85 to 15 mole % of (B-2), 1,4-cyclohexanedimethanol in which the content of the trans-form is at least 80 mole %. This polyester copolymer has a low rate of crystallization and provides a shaped article having a high heat resistance.

5 Claims, No Drawings

POLYESTER COPOLYMER

DESCRIPTION

1. Technical Field

The present invention relates to a polyester copolymer which gives a shaped article having a high heat resistance and which has a low rate of crystallization.

2. Background Art

Polycyclohexylenedimethylene terephthalate obtained from terephthalic acid and 1,4-cyclohexanedimethanol has a high melting point, and therefore, this polyester has a high heat resistance and a high resistance against the hydrolysis.

Attempts have been made to use this polyester as films or bottles by utilizing this characteristic property. This polyester, however, involves a problem in that since the polyester is readily crystallized, the range of the shaping conditions is narrow.

DISCLOSURE OF THE INVENTION

An object of the present invention is to provide a polyester copolymer having a low rate of crystallization and providing a shaped article having a high heat resistance.

More specifically, in accordance with the present invention, there is provided a polyester copolymer obtained by reacting (A) a dicarboxylic acid component composed mainly of terephthalic acid or a derivative thereof with (B) a glycol component comprising (B-1) 15 to 85 mole % of an aliphatic diol having 2 to 16 carbon atoms and (B-2) 85 to 15 mole % of 1,4-cyclohexanedimethanol in which the trans-form content is at least 80 mole %.

BEST MODE FOR CARRYING OUT THE INVENTION

The dicarboxylic acid component (A) used in the present invention preferably comprises at least 90 mole % of terephthalic acid or a derivative thereof. As the terephthalic acid derivative, there can be mentioned dialkyl esters of terephthalic acid having 1 to 10 carbon atoms in the alkyl group and diaryl esters of terephthalic acid having 6 to 14 carbon atoms in the aryl group. As specific examples of the terephthalic acid derivative, there can be mentioned dimethyl terephthalate, diethyl terephthalate, dipropyl terephthalate, dibutyl terephthalate and diphenyl terephthalate.

As the other dicarboxylic acid that can be used together with terephthalic acid or its derivative in an amount of not more than 10 mole % of the dicarboxylic acid component, there can be mentioned phthalic acid, isophthalic acid, adipic acid, sebacic acid, naphthalene-1,4-dicarboxylic acid and naphthalene-2,6-dicarboxylic acid.

The glycol component (B) used in the present invention comprises (B-1) 15 to 85 mole % of an aliphatic diol having 2 to 16 carbon atoms and (B-2) 85 to 15 mole % of 1,4-cyclohexanedimethanol in which the content of the trans-form is at least 80 mole %.

As the aliphatic diol (B-1) having 2 to 16 carbon atoms, there can be mentioned ethylene glycol, propylene glycol, tetramethylene glycol, hexamethylene glycol, neopentyl glycol, octamethylene glycol, butylethyl propanediol, diethyl propanediol and 3,9-bis(1,1-dimethyl-2-hydroxyethyl)-2,4,8,10-tetraoxaspiro[5,5]undecane, and ethylene glycol, propylene glycol, tetramethylene glycol and hexamethylene glycol are especially preferably used. These aliphatic diols can be used alone or in the form of a mixture of two or more thereof. A polyester copolymer obtained by using an aliphatic diol having more than 16 carbon atoms as the aliphatic diol is not preferred because a shaped article obtained from this copolymer has not a satisfactory heat resistance.

The amount of the aliphatic diol (B-1) having 2 to 16 carbon atoms is 15 to 85 mole %, preferably 30 to 70 mole %, based on the glycol component (B). The polyester copolymer in which the content of the component (B-1) is less than 15 mole % based on the component (B) cannot be used for attaining the object of the present invention, because the rate of crystallization of the polyester copolymer is high. The polyester copolymer in which the content of the component (B-1) is higher than 85 mole % based on the component (B) is not preferably used, because the rate of crystallization becomes high or the glass transition temperature is too low.

The content of the trans-form in 1,4-cyclohexanedimethanol (B-2) used in the present invention must be at least 80 mole %. A shaped article formed from a polyester copolymer obtained by using 1,4-cyclohexanedimethanol having a trans-form content less than 80 mole % is not satisfactory in the heat resistance.

The polyester copolymer of the present invention can be obtained by using terephthalic acid, dimethyl terephthalate or other terephthalic acid derivative, and ethylene glycol or other aliphatic diol and 1,4-cyclohexanedimethanol composed mainly of the trans-form as the main starting materials, carrying out an esterification reaction or an ester exchange reaction and subsequently, conducting a polycondensation reaction.

Catalysts customarily used for the preparation of polyesters can be used for the esterification reaction or ester exchange reaction and the polycondensation reaction.

A flame retardant, a fibrous reinforcer, a filler, an oxidation stabilizer, a heat stabilizer, a colorant, an ultraviolet absorbent and the like can be added to the polyester copolymer of the present invention according to need.

The present invention will now be described with reference to the following examples.

EXAMPLES 1 THROUGH 9 AND COMPARATIVE EXAMPLES 1 THROUGH 4

Terephthalic acid as the dicarboxylic acid component and a glycol component comprising 1,4-cyclohexanedimethanol, ethylene glycol, 1,4-butanediol and 1,6-hexanediol at a ratio shown in Table 1 were subjected to esterification at 260° C. in the presence of tetrabutyl titanate as the esterification catalyst in an amount of 0.1% based on the obtained polymer. Then antimony trioxide and phosphorous acid were added as the polycondensation catalyst in amounts of 0.03% and 0.04%, respectively, and polycondensation was carried out under a reduced pressure at 285° to 320° C., whereby various polyester copolymers were prepared. Each of the obtained polyester copolymers was recovered in the form of a strand polymer, cooled with water and pelletized by a cutter.

Each of the obtained polyester copolymers was decomposed with an aqueous solution of hydrazine, and the glycol component was analyzed by the gas chromatography. The results are shown in Table 1.

Each of the obtained polyester copolymers was dissolved in a phenol/tetrachloroethane mixed solvent (1/1 weight ratio) and the intrinsic viscosity $\eta sp/C$ was measured at a polymer concentration of 0.5 g/dl. The results are shown in Table 1.

The obtained pellet was molded into a molded article having a thickness of 6.4 mm, a length of 127 mm, and a width of 12.6 mm by using a 1-ounce small injection molding machine at a cylinder temperature of 310° to 320° C. and a mold temperature of 310° to 320° C.

Each of the molded articles was a transparent test piece. Each test piece was heated at 140° C. corresponding to the molding temperature for the preparation of a sheet or a bottle for 15 minutes, and the degree of whitening by the crystallization was examined. The results are shown in Table 1.

The degree of whitening was evaluated according to the following scale:
A: transparent (not changed)
B: slightly whitened and hazy
C: frosted glass-like and trasparent
D: turbid and opaque Accordingly, the range of application of the shaped article of the polyester resin is wider.

We claim:

1. A polyester copolymer obtained by reacting (A) a dicarboxylic acid component composed mainly of terephthalic acid or a derivative thereof with (B) a glycol component comprising (B-1) 15 to 85 mole % of an aliphatic diol having 2 to 16 carbon atoms and (B-2) 85 to 15 mole % of 1,4-cyclohexanedimethanol in which the trans-form content is at least 80 mole %.

2. A polyester copolymer as set forth in claim 1, wherein the derivative of terephthalic acid is a dialkyl ester of terephthalic acid having 1 to 10 carbon atoms in the alkyl group or a diaryl ester of terephthalic acid having 6 to 14 carbon atoms in the aryl group.

3. A polyester copolymer as set forth in claim 1, wherein the glycol component (B) comprises 30 to 70 mole % of the aliphatic diol (B-1) and 70 to 30 mole % of 1,4-cyclohexanedimethanol (B-2).

4. A polyester copolymer as set forth in claim 1, wherein the aliphatic diol is ethylene glycol.

5. A polyester copolymer as set forth in claim 1,

TABLE 1

|  |  | Trans-form content (mole %) of CHDM | Composition of glycol component (mole %) | | | | $\eta_{sp}/C$ | Whitening degree after heating |
|---|---|---|---|---|---|---|---|---|
|  |  |  | CHDM | EG | BG | HG |  |  |
| Example | 1 | 90 | 80 | 20 | — | — | 0.74 | B |
| " | 2 | 90 | 70 | 30 | — | — | 0.77 | A |
| " | 3 | 90 | 50 | 50 | — | — | 0.76 | A |
| " | 4 | 90 | 30 | 70 | — | — | 0.79 | A |
| " | 5 | 90 | 20 | 80 | — | — | 0.73 | B |
| " | 6 | 95 | 70 | 30 | — | — | 0.73 | A |
| " | 7 | 83 | 70 | 30 | — | — | 0.76 | B |
| " | 8 | 90 | 70 | — | 30 | — | 0.75 | A |
| " | 9 | 90 | 70 | — | — | 30 | 0.73 | A |
| Comparative Example | 1 | 90 | 100 | — | — | — | 0.78 | D |
| Comparative Example | 2 | 90 | — | 100 | — | — | 0.72 | D |
| Comparative Example | 3 | 70 | 80 | 20 | — | — | 0.74 | C |
| Comparative Example | 4 | 70 | 70 | 30 | — | — | 0.71 | C |

Note
CHDM: 1,4-cyclohexanedimethanol
EG: ethylene glycol
BG: 1,4-butanediol
HG: 1,6-hexanediol

INDUSTRIAL APPLICABILITY

The polyester copolymer of the present invention has a low rate of crystallization, and a shaped article obtained from this copolymer has a high heat resistance.

wherein the aliphatic diol is at least one member selected from the group consisting of propylene glycol, tetramethylene glycol and hexamethylene glycol.

* * * * *